No. 856,164. PATENTED JUNE 4, 1907.
G. D. KOEHLER.
FEED TROUGH.
APPLICATION FILED NOV. 8, 1906.

Witnesses: Inventor:
George D. Koehler

THE NORRIS PETERS CO., WASHINGTON, D. C.

UNITED STATES PATENT OFFICE.

GEORGE D. KOEHLER, OF MACEDONIA, IOWA, ASSIGNOR OF ONE-HALF TO A. ROBERT KOEHLER, OF MACEDONIA, IOWA.

FEED-TROUGH.

No. 856,164.

Specification of Letters Patent.

Patented June 4, 1907.

Application filed November 8, 1906. Serial No. 342,591.

*To all whom it may concern:*

Be it known that I, GEORGE D. KOEHLER, a citizen of the United States, and a resident of Macedonia, in the county of Pottawattamie and State of Iowa, have invented an Improved Feed-Trough, of which the following is a specification.

My invention is a sanitary feeder for swine, the same being so constructed that it may be easily and quickly cleaned.

It comprises a trough proper which forms the base of the feeder as a whole, and a part which is hinged thereto and consists of a hopper, for receiving the feed, and a series of transverse partitions arranged on the sides of the hopper and dividing the feeding space of the trough so as to form a series of what may be called "stalls," each adapted to accommodate the head of a single animal. When the feeder is in use, the hopper and partitions connected with it are secured firmly in position on the trough proper, but may be easily and quickly released so that they may be turned out, or over, laterally, to allow free access to the trough proper, for cleaning it. The trough may be constructed double or single; that is to say, the hopper may have partitions on both sides or on but one side, as preferred.

Figure 1:
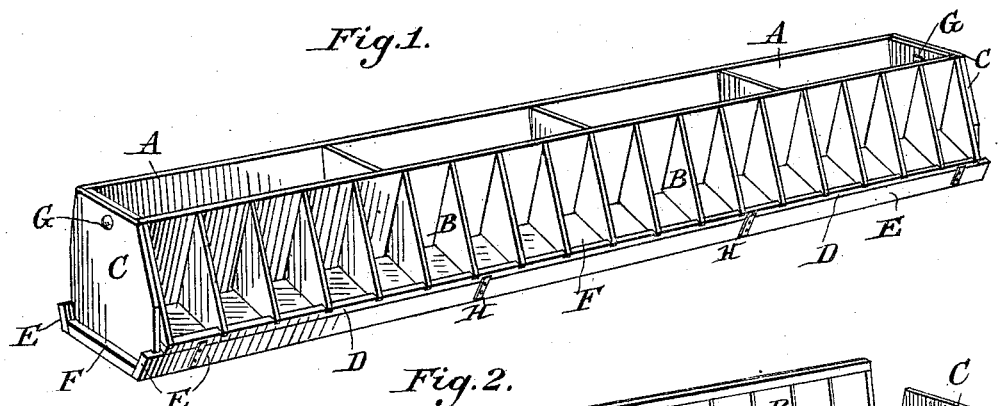
Figure 2:
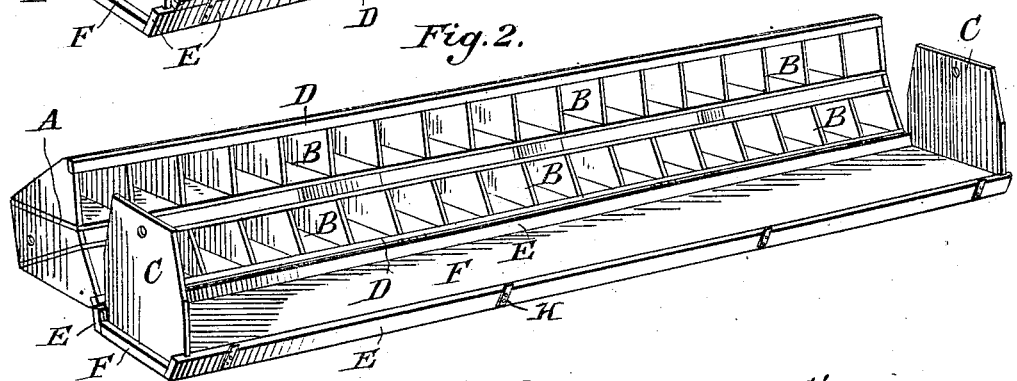
Figure 3:
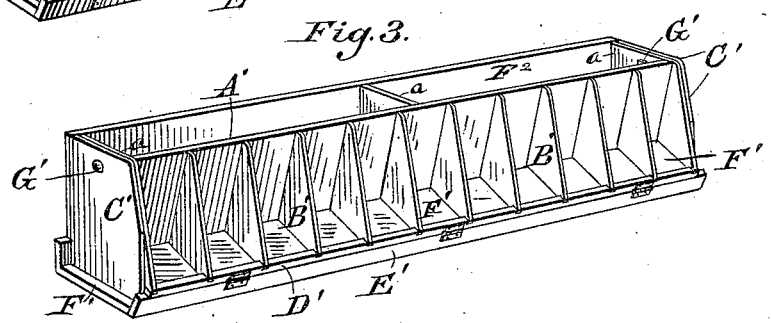
Figure 5:
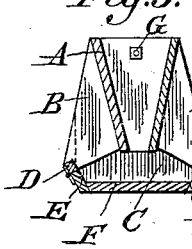
Figure 6:
Figure 4:
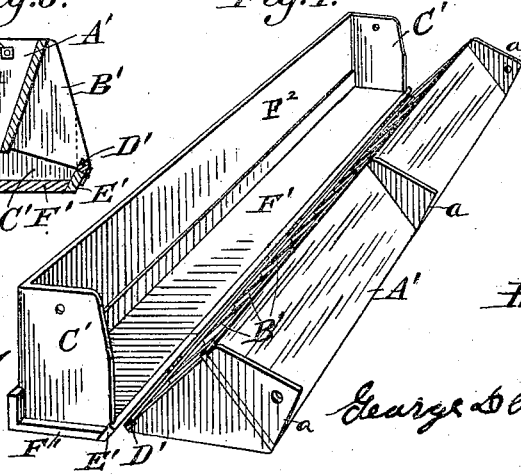

The details of construction, arrangement, and combination of parts embodying the invention are as hereinafter described, and illustrated in the accompanying drawing, in which Figure 1 is a perspective view of what constitutes the double form of feeder. Fig. 2 is a perspective view showing the hopper and partitions turned outward over the trough proper as required for cleaning the latter. Fig. 3 is a perspective view of the single feeder arranged as in use. Fig. 4 is a perspective view of the single feeder with the hopper and attached partitions turned outward as required for cleaning the trough. Fig. 5 is a cross-section of the double feeder shown in Figs. 1 and 2. Fig. 6 is a cross-section of the single feeder shown in Figs. 3 and 4.

I will first describe the double form of my invention shown in Figs. 1, 2, and 5.

F indicates the trough proper which forms the base of the feeder. It is composed of a flat bottom, outwardly inclined side pieces E, and projecting end pieces C. The part hinged thereto comprises a hopper A, a series of transverse partitions B, arranged on each side of the hopper, and side rails D arranged at and connecting the outer lower corners of the partitions and hinged to one of the side rails E of the trough. As shown in Figs. 2 and 5, the sides of the hopper A are inclined toward each other from the top downward, but are separated at the bottom sufficiently to allow free passage of the feed downward into the trough F. The partitions B are in the form of a scalene triangle, their inner edges being rigidly secured to the sides of the hopper, and spaced apart a distance sufficient to accommodate the head of a large swine. They thus constitute practically what may be termed stall divisions, or partitions separating the feeding space into stalls. The sides E of the trough proper are inclined outwardly, and the rails D of the hinged portion are similarly inclined, as shown in Figs. 3 and 5, so the animal may obtain easy access to the feed in the trough. Metal stay pieces H are attached to that one of the rails E which is opposite the one to which the movable portion is hinged, the same serving as an aid for holding the movable part in due position when closed on the trough as in Fig. 1. The two parts, to wit, the base or trough proper and the movable part comprising the hopper and the partitions, are secured to the end portions C of the trough by means of a suitable fastening, such as bolts G. When the two parts are thus connected they constitute one rigid structure, but when it is desired to clean the trough proper the fastenings G are detached and the hopper A and partitions B are turned outward on their hinges as indicated in Fig. 2, so that the trough proper is entirely exposed and accessible.

The single form of my improved feeder illustrated in Figs. 3, 4, 6, differs from the double form mainly in that the trough proper F' is provided with a rear side or wall F², and the movable part comprises a hopper A' having partitions B' on but one side, the lower corners of the partitions being connected with a rail D' which is hinged to the side E' of the trough, as shown. The back F² of the trough proper forms one side of the hopper when the latter is in the closed or working position indicated in Figs. 3 and 6. The inclined or front side of the hopper is therefore provided with a series of triangular pieces a, which, when the hopper is in closed position, abut the back F². Fastenings G' serve to secure the movable part to the fixed part, as in the case of the double form of feeder before described.

It is obvious that, by removing the fastenings G', the hopper and its attached partitions B' and a may be turned outward, as indicated in Fig. 4, for the purpose of cleaning the trough proper F'.

By my improved construction and arrangement of parts, I produce a double or single form of feeder which may be manufactured at small expense, is adapted for feeding grain, swill, or other food, while preventing waste of same, and may be cleaned, as occasion requires, with great facility.

I claim—

1. The improved feeder comprising a trough proper having vertical end portions and a part which is hinged thereto, the same consisting of a hopper which is open at the bottom and provided with a series of side partitions which are duly separated from each other to divide the trough into feeding spaces, a side rail connecting the lower outer corners of the several partitions, the same being hinged to the side of the trough, and means for fastening the movable part detachably to the trough, as described.

2. The improved feeder comprising the base constructed as a trough having outwardly inclined sides, a movable part, which is hinged to the trough on one side of the same, and comprising a hopper that is open at the bottom and side partitions attached to the side of the hopper and dividing the feeding space in the manner described, a rail connecting the lower outer corners of the several partitions and arranged at an inclination corresponding with the side of the trough, and hinges connecting said rail with the trough proper, substantially as described.

3. The improved feeder comprising a base portion formed as a trough, and a movable portion which is hinged thereto on one side, the same consisting of a hopper having outwardly inclined sides and made open at the bottom, triangular partitions arranged on opposite sides of the hopper and rigidly attached thereto, side rails connecting the lower corners of the partitions and one of them hinged to the adjacent side of the trough, and fastenings for securing the movable part to the base for use substantially as described.

GEO. D. KOEHLER.

Witnesses:
HENRY KENNEDY,
J. M. KELLEY.